(12) United States Patent
Levin et al.

(10) Patent No.: US 7,117,449 B1
(45) Date of Patent: Oct. 3, 2006

(54) METHOD AND APPARATUS TO PRESENT AN INTEGRATED PROCESS MODELER

(75) Inventors: Issac Stephen Levin, Sunnyvale, CA (US); Jon Rexford Degenhardt, Mountain View, CA (US); Atul Suklikar, San Carlos, CA (US); Peter A. Thorson, Oakland, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 10/334,922

(22) Filed: Dec. 31, 2002

(51) Int. Cl.
*G06F 13/00* (2006.01)

(52) U.S. Cl. ...................... 715/765; 715/764

(58) Field of Classification Search .............. 345/762, 345/763, 765, 852, 853, 854, 764; 707/104.1; 717/136, 135; 703/8, 9; 715/765, 763, 764, 715/762
See application file for complete search history.

(56) References Cited

U.S. PATENT DOCUMENTS

| | | | |
|---|---|---|---|
| 5,249,300 A * | 9/1993 | Bachman et al. | 707/104.1 |
| 6,268,853 B1 * | 7/2001 | Hoskins et al. | 700/83 |
| 6,415,027 B1 | 7/2002 | Malik | |
| 6,418,450 B1 | 7/2002 | Daudenarde | |
| 6,526,423 B1 * | 2/2003 | Zawadzki et al. | 715/506 |
| 6,574,635 B1 | 6/2003 | Stauber et al. | |
| 6,647,394 B1 | 11/2003 | Herzberg et al. | |
| 6,684,388 B1 * | 1/2004 | Gupta et al. | 717/136 |
| 6,693,647 B1 * | 2/2004 | Bernard et al. | 715/700 |
| 6,697,825 B1 * | 2/2004 | Underwood et al. | 715/530 |

FOREIGN PATENT DOCUMENTS

| | | |
|---|---|---|
| WO | PCT/US03/19955 | 1/2004 |
| WO | PCT/US03/25312 | 4/2004 |

* cited by examiner

*Primary Examiner*—Cao (Kevin) Nguyen
(74) *Attorney, Agent, or Firm*—Campbell Stephenson Ascolese LLP

(57) ABSTRACT

A method and apparatus for an integrated process modeler is described. The modeler comprises a non-technical interface to permit design of a business process by a non-technical use and a technical interface to implement substeps of the process to automate technical aspects of the process by a technical user, using the same process modeler. The resulting process designed to be used by non-technical employees, to automatically lead the non-technical employees through the business process.

38 Claims, 19 Drawing Sheets

|  | Business Analyst/Non-Technical Interface | Developer/Technical Interface |
|---|---|---|
| Purpose of modeler | To create and edit customized business processes | To implement/enable the business processes created by the business analyst |
| View of Enterprise Process | Role based Swim Lanes | System Based Swim Lanes |
| Tool Set Availability | Simplified, easy to use toolset, with more abstraction and reduced complexity | Full toolset allowing modification of elements, and integration with external systems |
| Integration | Assumes availability of services, does not need to worry about details | Provides a full set of integration tools, to enable the integration of the process with external systems including the Internet |

FIG. 6

METHOD AND APPARATUS TO PRESENT AN INTEGRATED PROCESS MODELER

FIELD OF THE INVENTION

The present invention relates to modeling, and more particularly to modeling a complex process.

BACKGROUND

In general, processes followed within an organization's ecosystem are described in various forms in most enterprise environments. This type of modeling is becoming increasingly important, as companies attempt to create uniform processes across the enterprise.

For example, a business analyst may create a process flow for a business process using tools such as Visio and iGrafx. However, in order to automate such processes, a different tool must be used, such as BizTalk, or similar tools.

Transferring such a process is, however, difficult. The business analyst must explain to a developer what each of the steps of the process mean. Then, the developer creates an automated process, which may be used by other employees to actually follow the process sketched out by the business analyst. This process is lengthy and complex, and miscommunication creates rework, thereby delaying implementation.

Additionally, best practices may be provided to corporations. These best practices are automated processes that may be followed for various actions. However, these processes may not match perfectly with the requirements of the customer, and in general are difficult to modify.

SUMMARY OF THE INVENTION

A method and apparatus for an integrated process modeler is described. The modeler comprises a non-technical interface to permit design of a business process by a non-technical use and a technical interface to implement substeps of the process to automate technical aspects of the process by a technical user, using the same process modeler. The resulting process designed to be used by non-technical employees, to automatically lead the non-technical employees through the business process.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 illustrates one embodiment comparison between business analyst and developer features.

DETAILED DESCRIPTION

A method and apparatus for an integrated process modeler is described. The process modeler provides a single tool for designing, debugging and deploying an end-to-end business process. A business process, in this context is a structured series of documented activities organized to achieve a specific business objective. The structure of a particular business process may vary by company, as there are multiple practices for executing any specific objective. Business processes, which can be comprised of multiple sub-processes, are graphically represented in flow diagrams and can span third-party applications. An end-to-end business process is a major business process for the company, one that may span multiple divisions or organizations within as well as outside the company's legal boundaries. An end-to-end business process also can involve interaction with multiple interconnected computer systems executing either autonomously or with end users. The end-to-end business process is typically a long running process occurring over hours, days, weeks or months rather than minutes or seconds. The present system permits the design of such an end-to-end business process, as well as the simpler basic business processes.

By using an end-to-end business process, the modeler spans multiple process types (e.g. enterprise, Siebel, Integration, task), as well as multiple roles (e.g. business analyst, developer), and allows for seamless transition between these components.

The process modeler is capable of designing process flows involving user interaction (e.g. the create call list task). The user interaction design includes the design of a user interface, as well as process steps that require waiting for particular types of inputs from particular users. For one embodiment, both the non-technical and technical user can design these user interaction flows. The process modeler includes the ability to create user interaction as well as integration with other applications.

Figure 1:
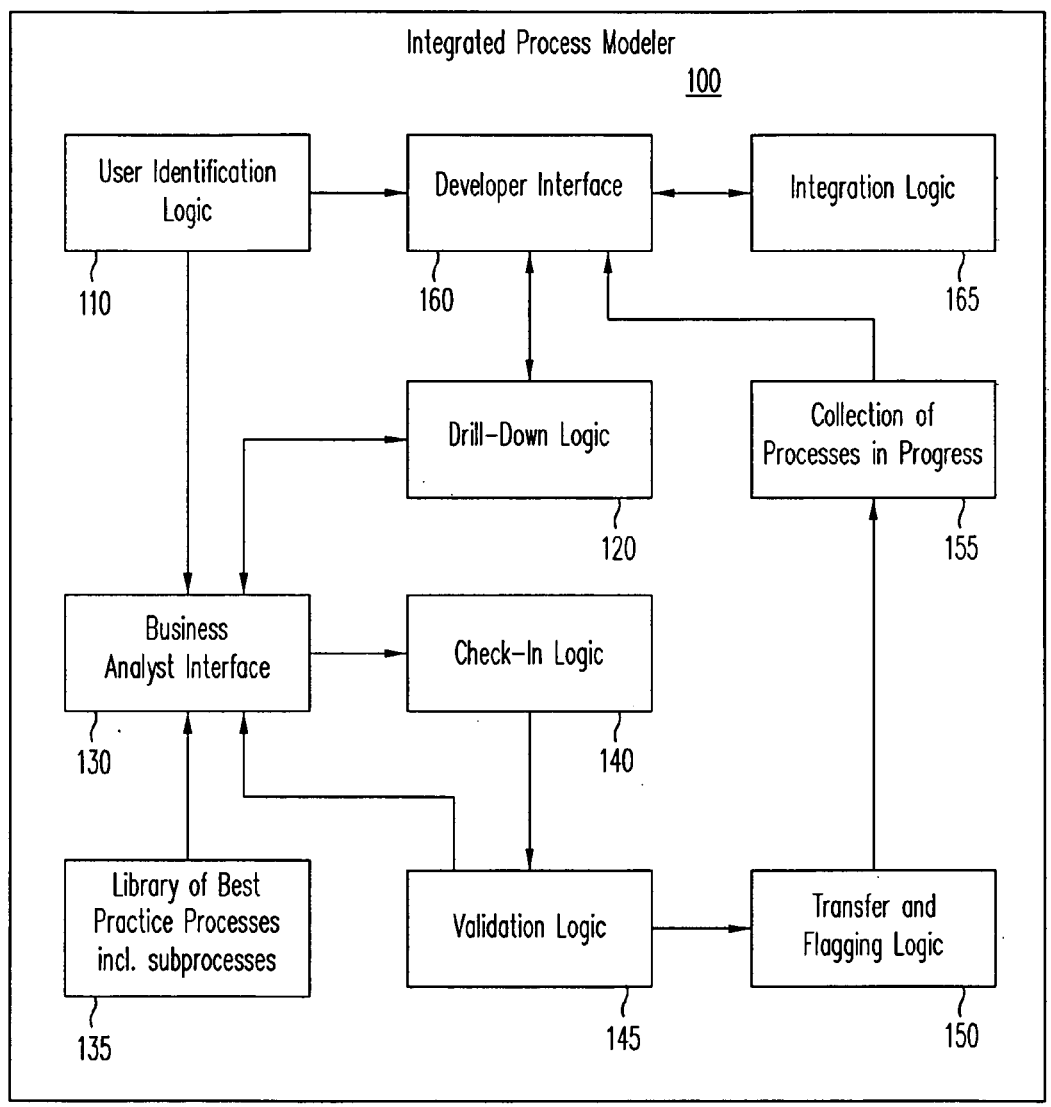
FIG. 1 is a block diagram of one embodiment of an integrated process modeler.

FIG. 1 is a block diagram of one embodiment of an integrated process modeler. The process modeler 100 includes a user identification logic 110, which determines what type of interface is presented to the user. The business analyst interface 130 permits the design of new processes as well as the editing of existing processes. The developer interface 160 permits the implementation and integration of the process designed by the analyst.

For one embodiment, user identification logic 110 uses the login and group association of the user to identify the user type. For another embodiment, the user may select his or her preferred interface. For another embodiment, each user that has access to the modeler 100 may be specified to the user identification logic 110. Thus, in addition to selecting the user interface, user identification logic 110 may provide security functions. This prevents unauthorized users from altering any processes, or creating new and incorrect processes.

The business analyst interface 130, as noted above, permits a business analyst or equivalent individual to create a process. This interface 130 may also be referred to as the "editor" since it permits the user to edit or create a process. The term "business analyst" refers to an individual who is empowered to create processes for use by the corporation. In general, such a person need not be an engineer or programmer, and will therefore be referred to as a non-technical user. However, a business analyst may, of course, be a programmer or technically knowledgeable. The term "non-technical user" is simply used to define the fact that the business analyst need not know programming in order to create or edit processes.

This process is designed to automate certain procedures inside or outside the company. The process may, for example, be the process of fulfilling a trade request. This example will be used throughout the present specification. However, it is to be understood that any procedures may be automated.

The modeler 100, for one embodiment, provides access to a library of best practice processes 135. Best practice processes are pre-defined processes. For one embodiment, a company such as Siebel provides a plurality of predefined best practice processes to its clients. These clients can then use the business analyst interface 130 to customize and change the best practice processes, or may choose to adopt the best practice processes as-is. The library 135 is available to the business analyst interface 130. For one embodiment, in addition to being able to import entire best practice processes, the business analyst may pick subprocesses from the library 135. For example, a subprocess may be "confirm with supervisor." A subprocess may have multiple steps in it. For example, confirming may include sending an email, waiting for a response, and if the proper response is received, noting the confirmation.

The drill-down logic 120 permits the business analyst to go from subprocess to steps. In general, the process is shown as a series of steps. Each step may have one or more steps, or sub-steps. The business analyst may use business analyst interface 130 to drill-down from process to subprocess, and from subprocess to atomic steps. The various user interfaces shown to the business analyst are described below.

Once the business analyst completes the design of the process, he or she checks it in using check-in logic 140. Checking in refers to the indication that the process is complete. Validation logic 145 verifies that the process meets certain basic criteria. For example, the validation logic 145 may verify that each element is connected to at least one other element. The validation logic 145 may also verify that there are no connectors that have no defined end-points. Furthermore, for one embodiment, validation logic 145 may verify that any "decision element" has two out-going connectors, one for each possible result. If the validation logic 145 determines that there are some errors, it passes the process back to the business analyst interface 130, alerting the business analyst to correct the indicated errors. For one embodiment, the validation logic 145 may flag any errors, or otherwise provide indication on what needs to be done.

If the validation logic 145 determines that there are no errors, it passes the process to the transfer and flagging logic 150.

The transfer and flagging logic 150 transfers the process to the collection of processes in progress 155. For one embodiment, processes which have not completed implementation are stored in a collection 155. This collection is accessible to developers, for implementation, and for one embodiment accessible to the business analyst for further editing. However, these processes in progress 155 are not available to the company in general, and may not be used.

The transfer and flagging logic 150 for one embodiment further flags the process. Flagging marks each element and/or each connector that requires work for implementation. For one embodiment, there are multiple types of flags, each flag indicating the type of work that needs to be done. For example, a flag may indicate that insufficient detail has been provided for executable meaning. Alternatively, a flag may indicate that a particular communication needs to be defined. For example, the business analyst may define an element as "contact supervisor" but may not provide the definition of how to accomplish this task. This flag is then used by the developer to work on the proper elements and connectors. This flagged version of the process is then stored in the collection 155.

The developer may, through developer interface 160 pick up a process in progress from the collection 155. The term "developer" is used for simplicity here. The "developer" may be any user who is able to create executable processes. In general, the developer is a technical user, such as a programmer. The developer interface 160 may also be referred to as the implementation interface 160 since it is used to implement the process into an executable process.

For one embodiment, processes may be assigned to a particular developer or team of developers for implementation. In that case, user identification logic 110 controls whether the developer may access/work on a particular process.

The developer 160 may edit the process to make it executable. Furthermore, developer may use drill-down logic 120 to see the elements and subprocesses that are used. For one embodiment, developer may further access the exiting processes or subprocesses defined in the library 135. This enables reuse of previously defined steps and subprocesses.

Integration logic 165 permits the developer to integrate the process with third party applications and software. For example, the integration logic 165 permits the process to obtain data from external data sources, such as the Internet. For example, a stock price may be obtained from an Internet source, and this data may be used within the process.

Once the developer completes the enabling of the process, the process is available for use. For one embodiment, a business analyst or supervisor must do a final approval. For one embodiment, a quality assurance team may further perform testing on the process. Once the process has been approved, it may be implemented within the corporation. This means the process is made available to various users. For one embodiment, such processes are further put into the library 135, to permit reuse of various steps within the process.

In this way, the present integrated process modeler 100 permits a business analyst to create a process, and allows the developer to make the process executable. The resulting process may be used throughout the company.

Figure 2:
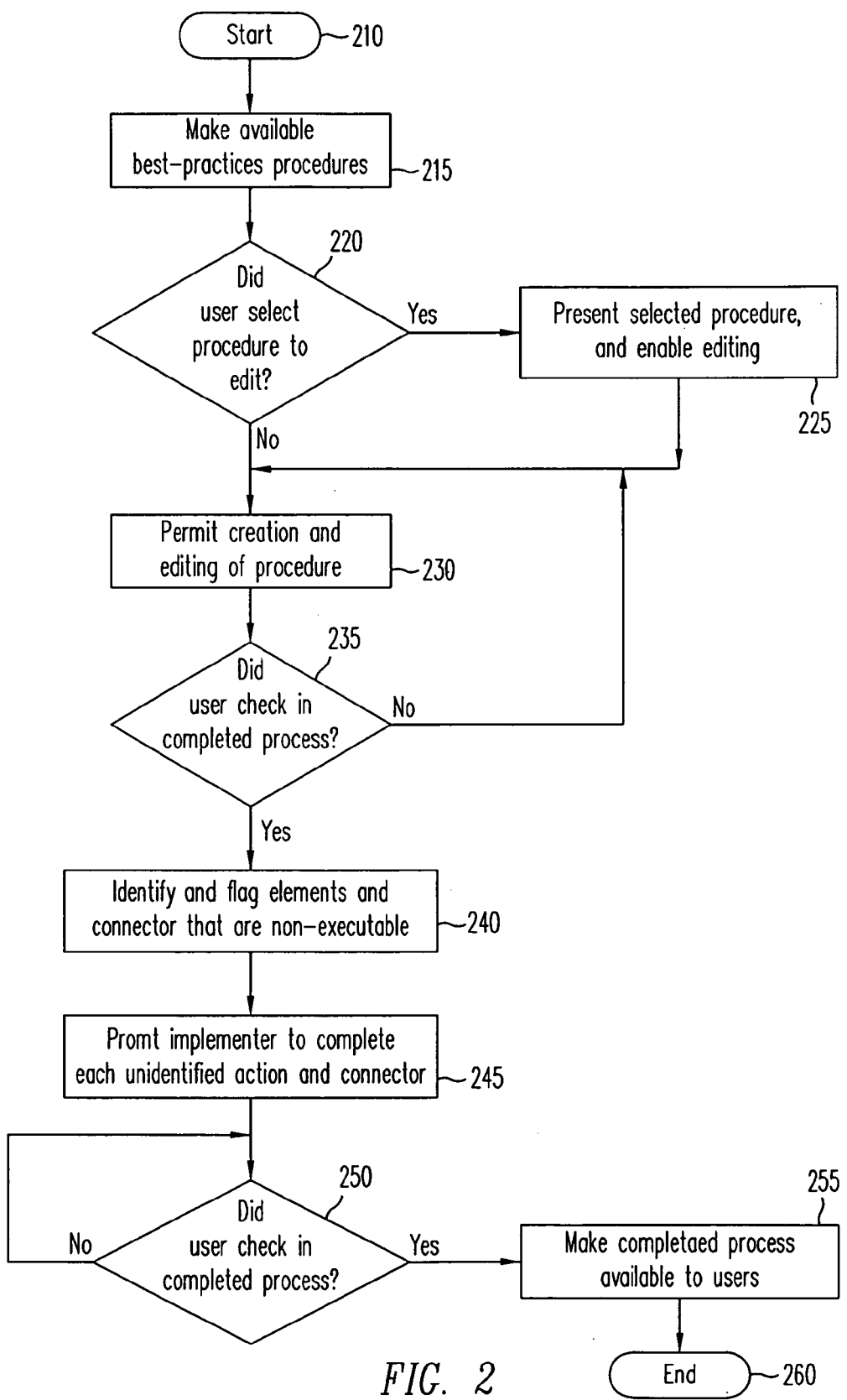
FIG. 2 is an overview flowchart of one embodiment of using the integrated process modeler.

FIG. 2 is an overview flowchart of one embodiment of using the integrated process modeler. The sequence starts at block 210. At block 215, the best practices processes are made available. For one embodiment, the best practices are stored in a library, and are available for use, editing, or extracting steps.

At block 220, the sequence determines whether the user selected a best practices process to edit. If so, the selected process is shown to the user, at block 225, and editing is enabled. For one embodiment, a high level diagram of the selected process is displayed. The user may then edit any of the steps of the process, or any of the subprocesses within the process. If the user did not select a best practices process, the sequence continues to block 230.

At block 230, the system permits the creation and editing of the various procedures and subprocesses embodied within the process. If no process was selected, the user may choose to create an entirely new process at this point. The user in this instance need not be a programmer or technical user. Rather, the user may be a business person or manager who knows what types of procedures are being used in the company.

At block 235, the sequence determines whether the user checked in the process. Checking in indicates that the user has completed editing the process, and the process may be handed off. For one embodiment, the user may indicate this by storing the process in a special location, such as the "to be enabled" directory. If the user has not yet checked in the process, the sequence returns to block 230, permitting further editing. Of course, the user may temporarily store an incomplete process, and access it at a later time.

If the user checked in the process, the sequence continues to block 240. At block 240, the sequence identifies and flags connectors and steps that are non-executable, or not sufficiently defined.

At block 245, the implementer, or technical user, is prompted to complete each flagged item. Note that the implementer generally checks out the process from the collection of processes in progress. The flags prompt the implementer to complete the process, and for one embodiment identify the type of work that needs to be done for completion.

At block 250, the sequence determines whether the user has checked in the process. For one embodiment, once the technical user completes the implementation, he or she checks the process back in. For one embodiment, in this instance checking in further includes performing quality assurance/testing on the process, and getting a final sign-off from an appropriate individual, such as a manager. If the process has not yet been checked in the sequence returns to block 245, permitting further edits.

If the process has been checked in, the sequence continues to block 255, where the completed process is made available to users. These users are, for example, the customer support people who use the process to provide consistent and complete customer support. For one embodiment, each process is targeted at a particular group of employees, and creates a consistent, complete, easy to train on, and simple to use process. The sequence then ends at block 260.

Figure 3A:
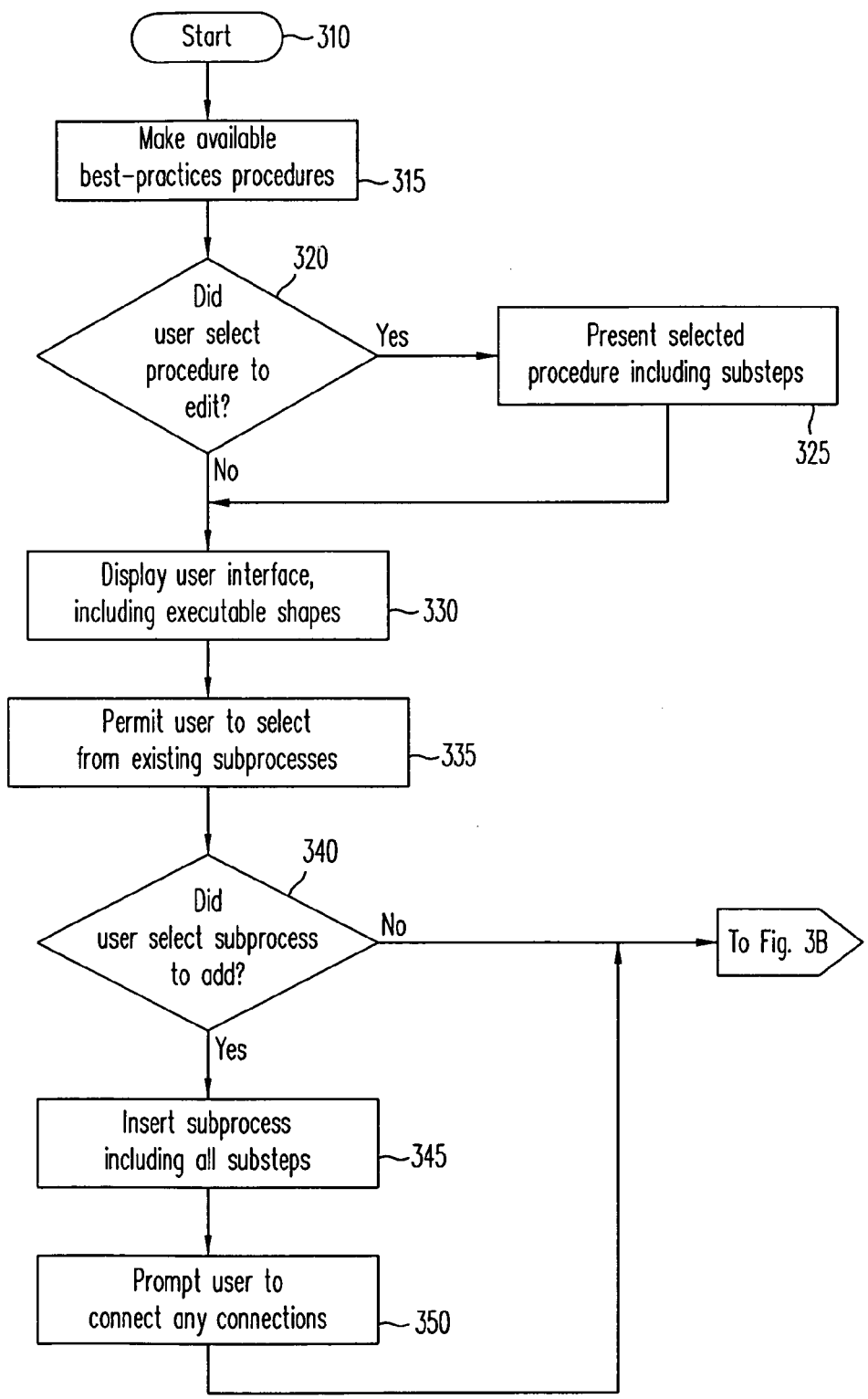
FIGS. 3A and 3B are a flowchart of one embodiment of the business analyst using the process modeler to create a new process.
Figure 3B:
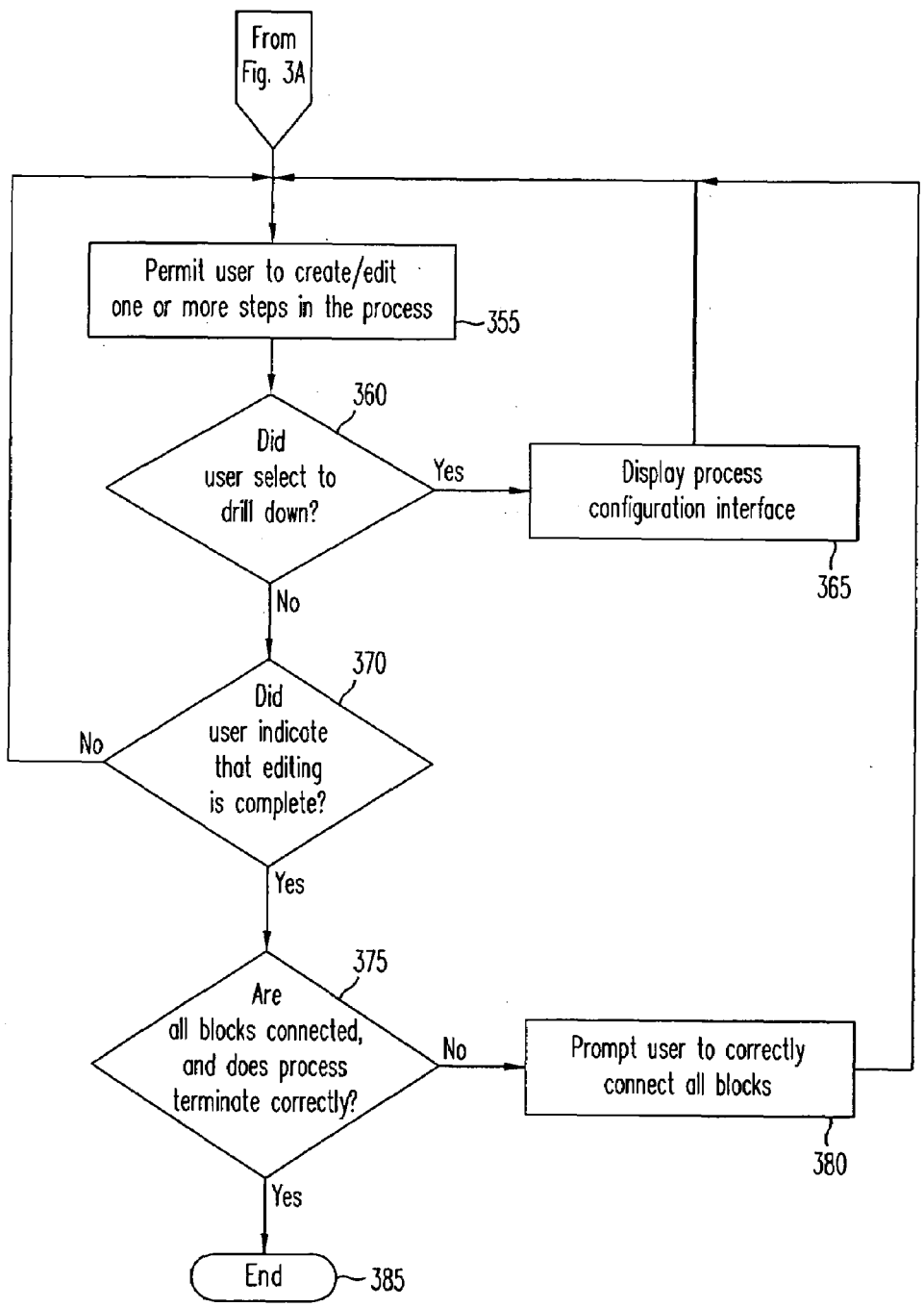

FIGS. 3A and 3B are a flowchart of one embodiment of the business analyst using the process modeler to create a new process. The sequence starts at block 310, when a business analyst or authorized employee logs into the system.

At block 315, the best practices processes are made available to the user. This library is accessible to the business analyst to permit tweaking of existing processes, creation of new processes based on existing processes, or simply to use steps or subprocesses from existing processes. By permitting such recycling, the creation of a new process is significantly simplified.

At block 320, the sequence determines whether the user selected a process to edit, and if so, at block 325, the selected process is displayed to the user. The selected process, for one embodiment, shows the high level process, and may include multiple subprocesses which may be reached by drilling down. The sequence then continues to block 330. If the user did not select a process to edit, the sequence continues directly to block 330.

At block 330, the user interface including executable shapes is displayed to the user. An exemplary embodiment of such a display is shown in FIG. 7.

Figure 7:
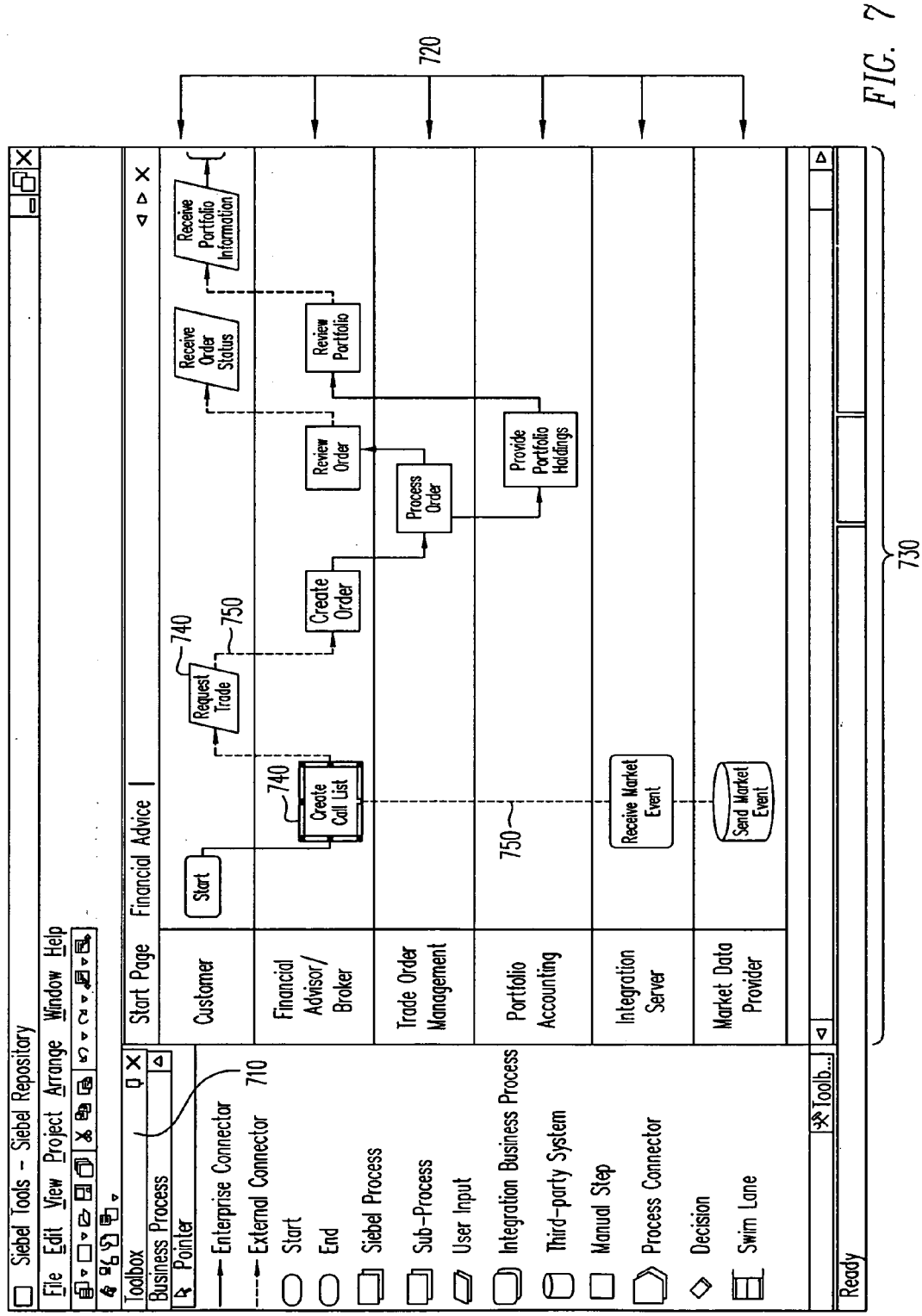
FIG. 7 illustrates one embodiment of a user interface presented to a business analyst.

As can be seen in FIG. 7, the toolbox 710 presents a set of processes and connectors. For one embodiment, the toolbox 710 further permits the creation of additional swim lanes. Swim lanes 720 provide a differentiation between various actors or various systems. In this role-based view, the swim lanes 720 define the actors such as customer, broker, accounting, etc. The business analyst may add additional swim lanes 720 using toolbox 710. As can be seen in FIG. 7, the process 730 includes a starting point, a number of elements 740 and connectors 750 between the elements 740. As can be seen, the various types of functions or elements that may be added to the process have different shapes. For one embodiment, shape and color may be used to identify various types of functions.

At block 335, the user is permitted to select an existing subprocess or step from the existing list of subprocesses in the library of processes. This simplifies implementation, since the user can simply insert a fully functional process, instead of designing it anew. If the user did not select a subprocess for insertion, the sequence continues to block 355. Otherwise, the sequence continues to block 345.

At block 345, the subprocess including all of the substeps and elements is inserted in the indicated location. For one embodiment, there is a placeholder inserted by the user, to indicate the location where the subprocess should be inserted. Thus, the user first puts the placeholder in the proper location, and then selects the subprocess, which is inserted in the location of the placeholder.

At block 350, the user is prompted to make any connections needed to properly connect the inserted subprocess. Each process and step has one or more connections, to provide a flow of the process. An inserted subprocess will generally have at least one, and may have any number of connectors. The user is prompted to connect each of these connectors. For one embodiment, the connectors include a tag or flag indicating the type of connection being made. The sequence then continues to block 355.

At block 355, the user is permitted to edit one or more steps, connections, processes, subprocesses—or steps—in the process.

Figure 8A:
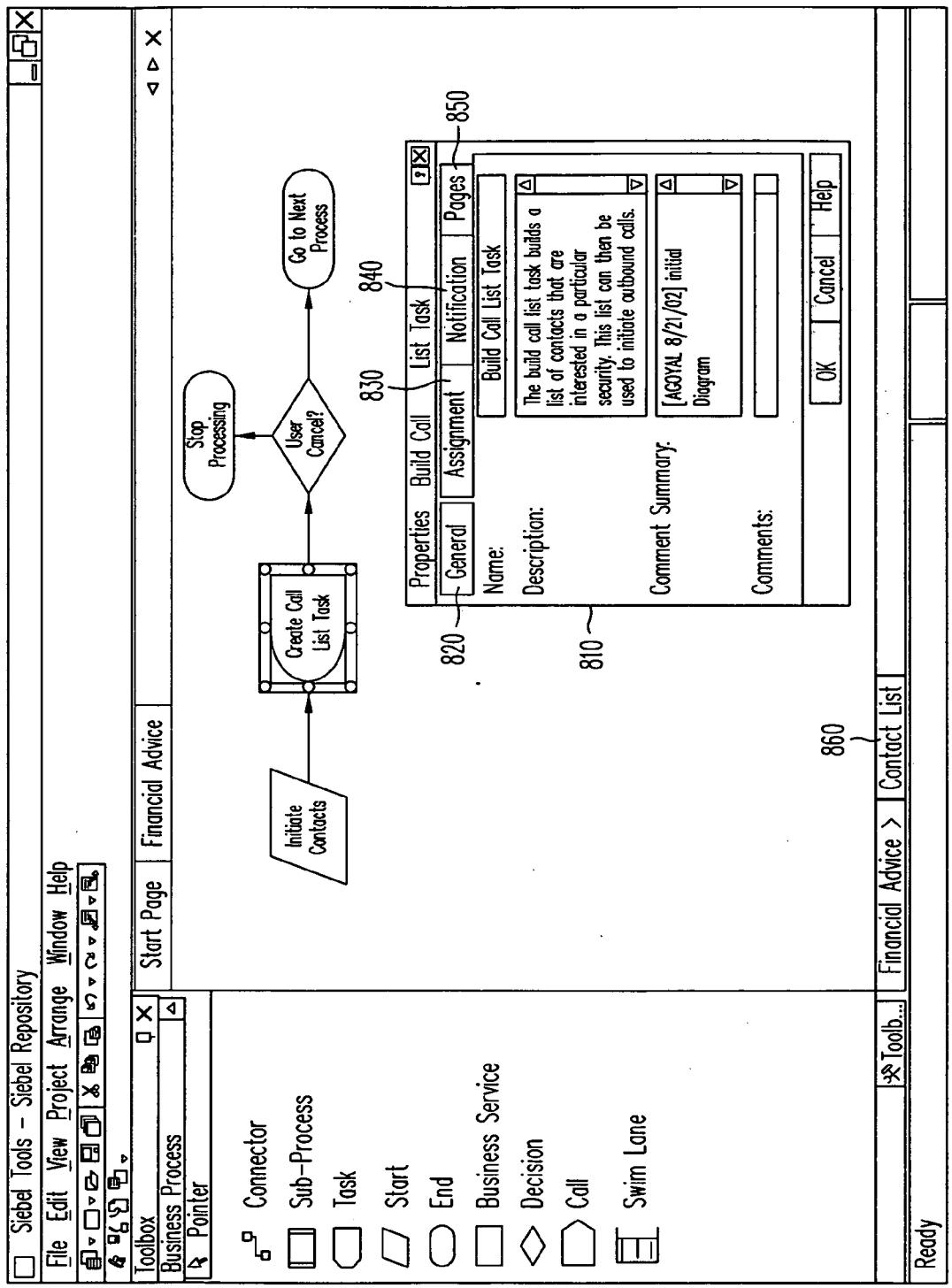
FIGS. 8A and 8B illustrate embodiments of a user interface showing the drilldown process.
Figure 8B:
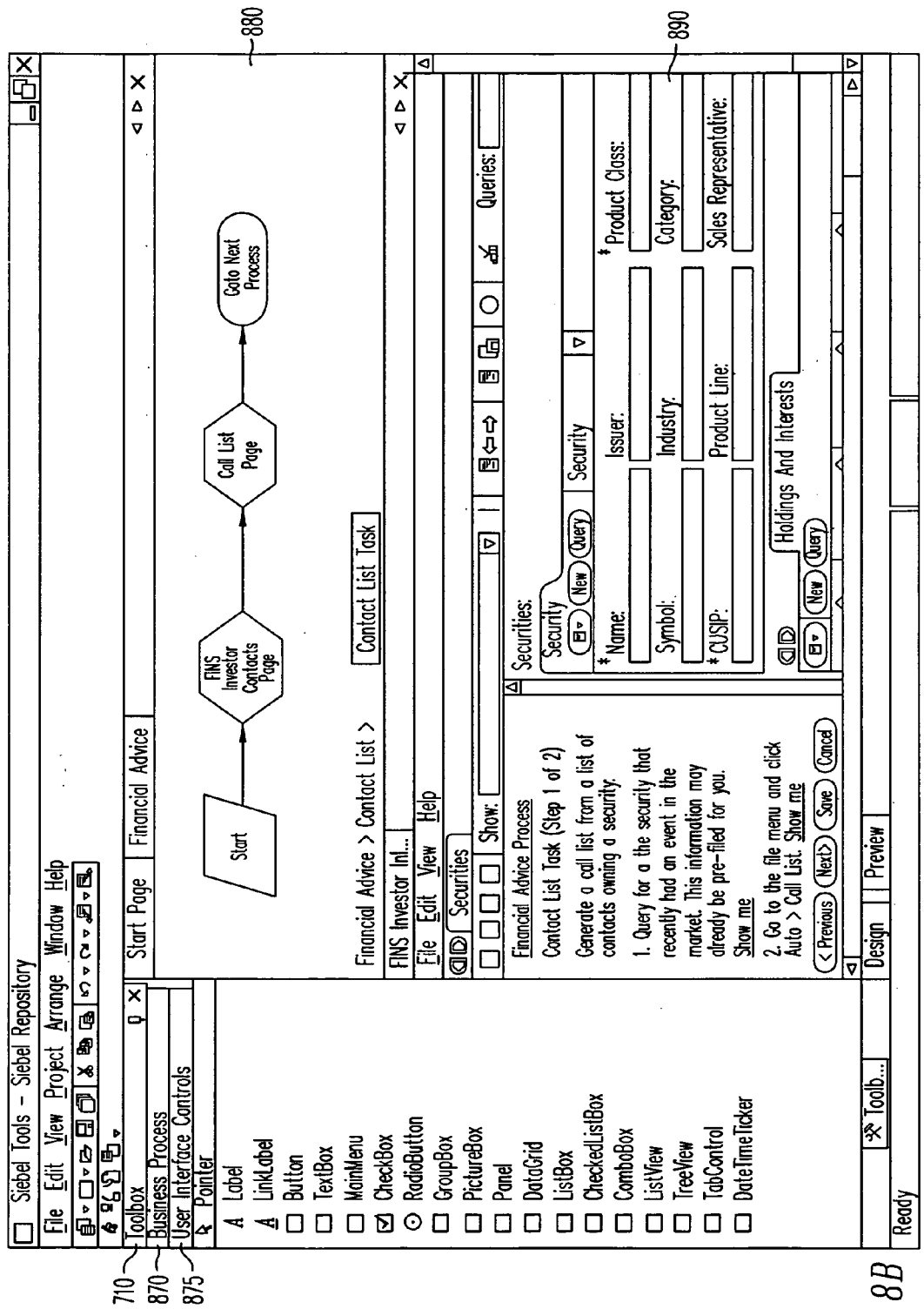

At block 360, the sequence determines whether the user selected to drill down. Drilling down shows the substeps/subprocesses that form a particular element in a process. If the user is drilling down, at block 365, the drill-down interface is shown, along with the substeps/subprocesses that form the element. FIGS. 8A and 8B illustrate two levels of drilling down.

FIG. 8A illustrates one embodiment of the process configuration interface reached by drilling down the "create call list" process step, shown in FIG. 7. As can be seen, the properties dialog box 810 enables the business analyst to provide a description/definition of the task. The general tab 820 provides a basic description of the task. The assignment tab 830 defines who should be assigned to perform this task. For one embodiment, this indicates which swim lane the task inhabits. The notification tab 840 indicates whether anyone should be notified when this task is performed, while the pages tab indicates where in the process this task should occur. This indicates on which pages, and under what conditions, the task is exposed. The thread bar 860 indicates where in the process the business analyst is.

FIG. 8B illustrates one embodiment of the configuring of the task. The configuration interface includes the toolbox 710 including two tabs, one for the business process 870, shown also in FIG. 8A above, and one for the user interface (UI) process 875, shown here. The task process configuration window 880 is the interface for configuring a task process, while the UI configuration window 890 is the interface for configuring a page. This is the page that would be displayed to a user who is using the process, once implemented. The business analyst can create the UI, and specify any aspects. For one embodiment, the business analyst can preview the user interface created in this way, and step through it.

Returning to FIG. 3, if the user elects to drill-down the above described pages are displayed. The sequence then returns to block 355, permitting the user to edit the substeps/subprocesses. If the user did not choose to drill down, the sequence continues to block 370.

At block 370, the sequence determines whether the user has indicated that the editing is complete. The user, once satisfied with the process, can indicate that the editing is complete. If the user did not indicate this, the sequence continues to block 355, permitting the user to further edit/create steps. Of course, the user may at any time return to block 340, and select a subprocess to add. As is generally true in such flowcharts, the decision blocks are actually implemented as interrupts, and may occur at any time. Thus, the user may at any time choose to add a subprocess, choose to drill-down, or choose to indicate that the editing is complete.

If the user indicates that the editing is complete, the sequence continues to block 375. At block 375, the sequence determines whether all blocks are logically connected, e.g. all blocks have at least one connector attached to them, and all connectors are coupled to a block, e.g. there are no dangling connectors. For one embodiment, the system further verifies that the process is started and terminated properly. If any of these conditions is not met, the sequence continues to block 380, where the user is prompted to correct these errors. For one embodiment a flag or tag may indicate each of the errors that should be corrected. The sequence then returns to block 355, permitting the user to edit and correct the process.

If the blocks are properly connected and terminated, the sequence ends at block 385. For one embodiment, the process is sent to the flagging logic, described in FIG. 4.

Figure 4:
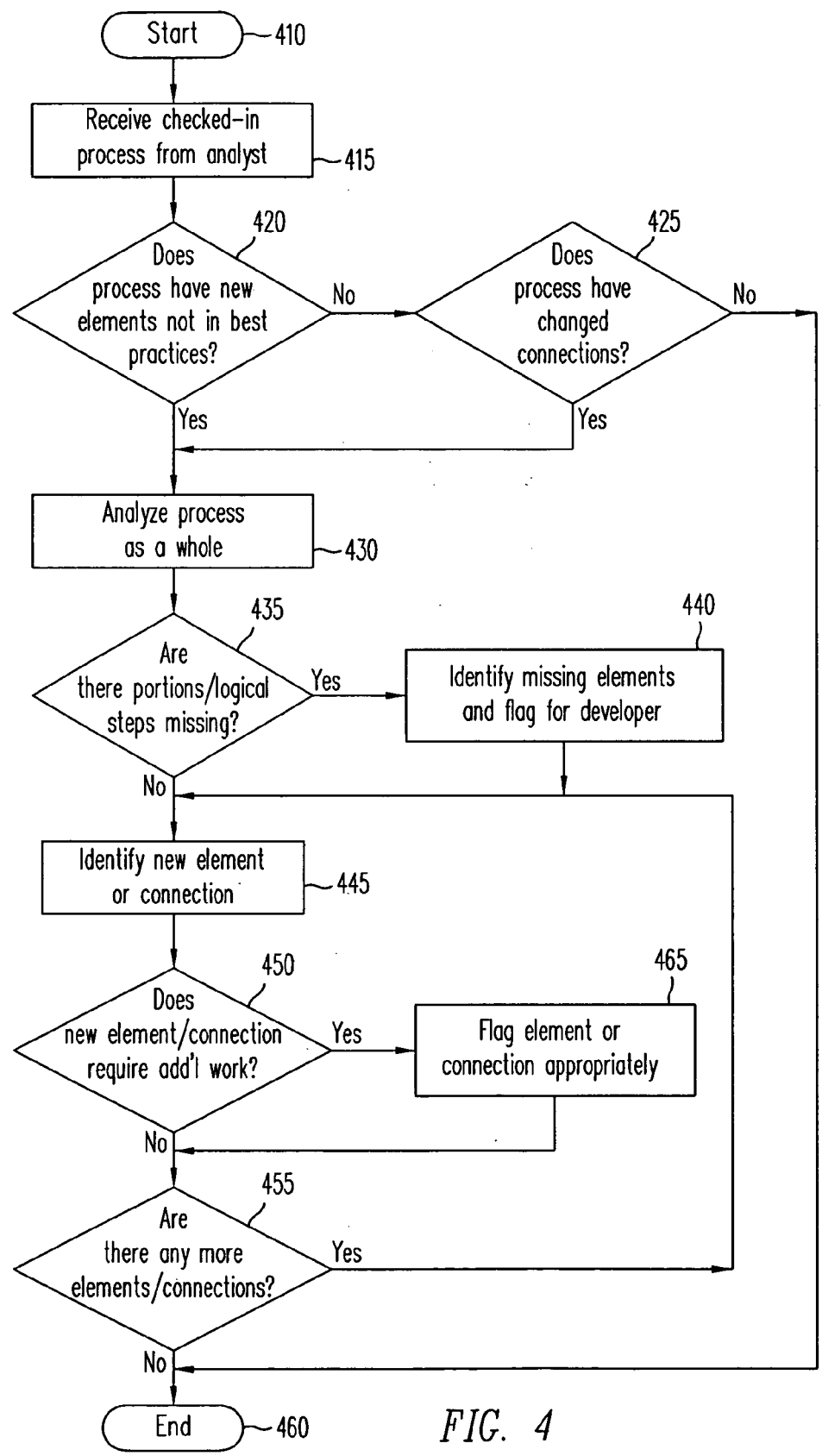
FIG. 4 is a flowchart of one embodiment of the responsibility transfer from the business analyst to the implementing engineer.

FIG. 4 is a flowchart of one embodiment of the responsibility transfer from the business analyst to the implementing engineer. The sequence starts at block 410. At block 415, the checked-in completed process is received from the business analyst. Of course, the present sequence may be executed at any time. For one embodiment, the sequence is automatically initiated when a completed but not yet implemented process is received from the business analyst.

At block 420, the sequence determines whether there are elements that are not from a best practices process. The checked in process may be identical to a best practices process. In that instance, no implementation is needed, since the best practices process by definition is already implemented.

If there are no new elements, the sequence at block 425 determines whether any of the connections have been changed. Each process consists of a plurality of elements interconnected by connectors. If neither the elements nor the connectors have changed, no implementation is required. Thus, the sequence proceeds directly to block 460, and ends.

If either the elements, at block 420, or the connections at block 425, have changed, the sequence continues to block 430.

At block 430, the process as a whole is analyzed.

At block 435, the sequence determines whether there are any portions or logical steps missing. A business analyst may fail to think of steps such as error checking or data validation. If there are such steps missing, the sequence continues to block 440 to identify the missing elements and flag them for the developer. For one embodiment, a general note may be attached to the process, identifying the portions/logical steps that are missing. Alternatively, the sequence may add a flag at the location where such portions/logical steps are to be inserted. If there are no portions/steps missing, the sequence continues to block 445.

At block 445, a new step or connection that was added by the business analyst is identified. For one embodiment, the sequence walks through the entire process, step-by-step, to identify any new steps. For one embodiment, the sequence performs this walk-through at the lowest drill-down level.

At block 450, the sequence determines whether the step/connection require additional work. For one embodiment, the sequence identifies whether the step or connection is imported from an existing best practice process. If so, the sequence determines that no additional work is required. If the step/connection is newly created, it is identified, for one embodiment as requiring additional work. For another embodiment, the system may perform further analysis to determine whether the newly created connection/step requires work. For one embodiment, the system may attempt to execute the step to determine whether additional work is required. Alternative methods of identifying whether a particular step/connection is functional/implemented may be used. If the step requires work, at block 465, the step or connection is flagged. For one embodiment, the flag may specify the type of work required to implement the step/connection. For example, the flag may identify that the connection requires integration with an external service, such as a web service.

At block 455, the sequence determines whether there are any further steps/connections that should be analyzed. If there are further steps, the sequence returns to block 445, to identify the new step/connection. If there are no further steps, the flagging sequence is completed and the sequence ends at block 460.

Figure 9:
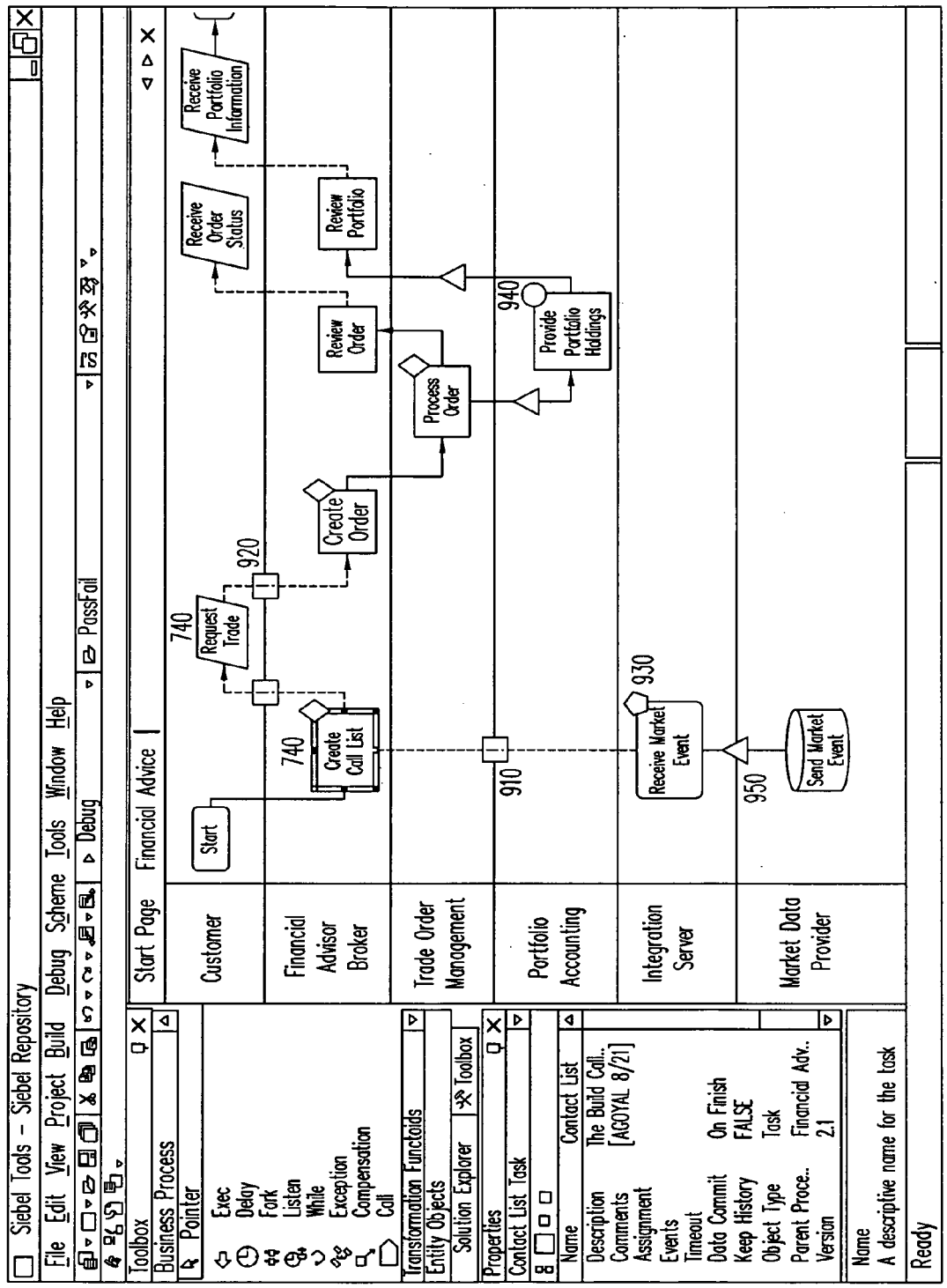
FIG. 9 illustrates one embodiment of the transfer flagging that automatically indicates which aspects of the process require implementation work.

FIG. 9 illustrates one embodiment of the process after the flagging is completed. As can be seen, a number of the elements 740 and elements 750 are flagged 910–950. The icons 910–950 provide visual feedback to the developer signifying the different types of work that need to be done. For one embodiment, any shape can potentially have icons next to it. In this instance, the icons 910–950 are designated with various shapes. For another embodiment, colors, symbols, or other differentiators may be used instead of, or in conjunction with, using different shapes.

Figure 5:
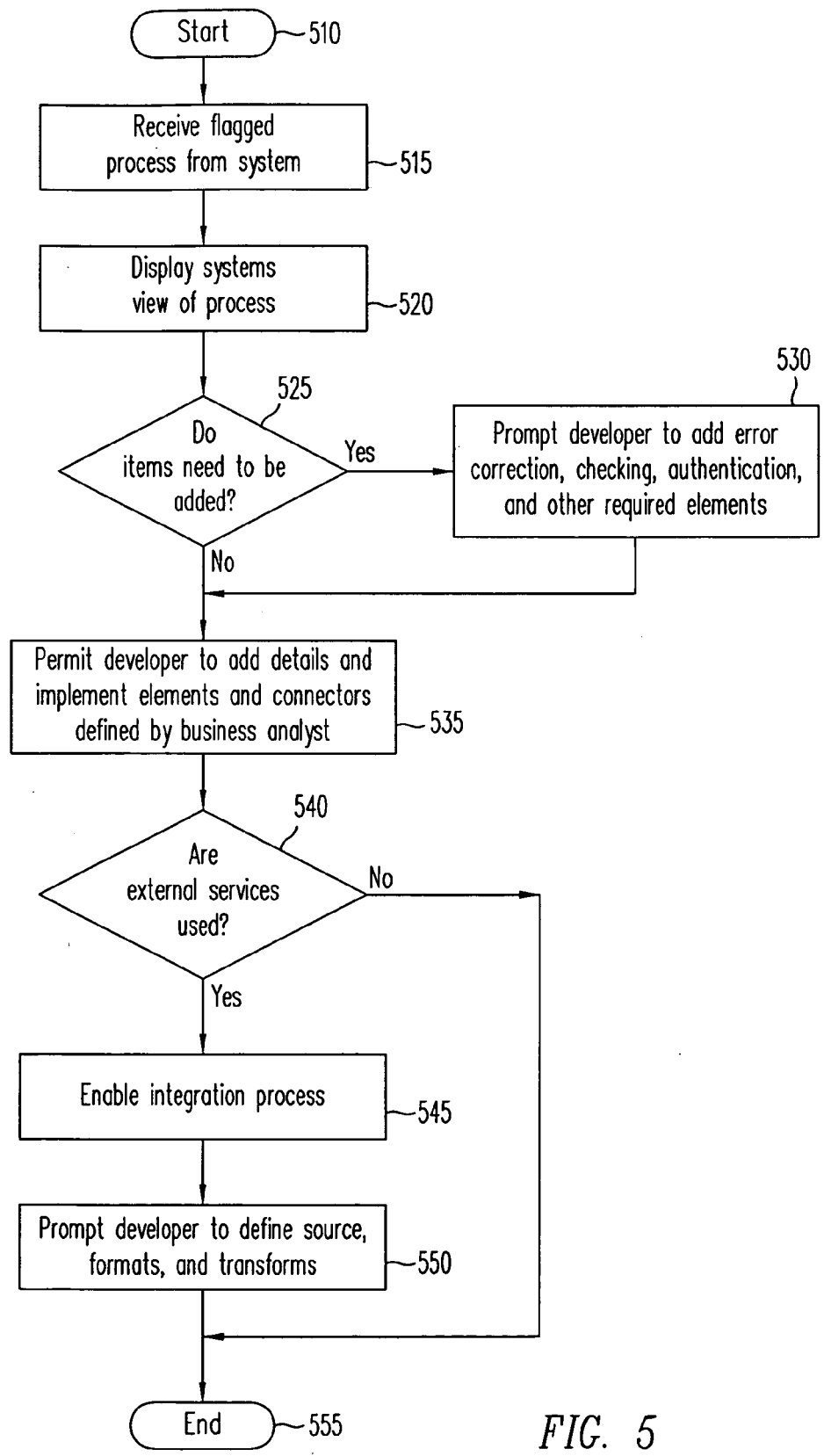
FIG. 5 is a flowchart of one embodiment of the implementing engineer using the process modeler to enable to the process created by the business analyst.

FIG. 5 is a flowchart of one embodiment of the implementing engineer using the process modeler to enable to the process created by the business analyst. The sequence starts at block 510. For one embodiment, this sequence is available any time there is a process checked in by the business analyst that has not yet been implemented.

At block 515, the flagged process is received from the system. For one embodiment, the developer may select a process for implementation. For one embodiment, a process may be assigned to a particular developer. For another embodiment, each process may have a priority stamp or similar indication of priority. Thus, the developer may be prompted to implement the most urgent or highest priority process. The developer, at block 515, checks out a process for implementation.

Figure 10A:
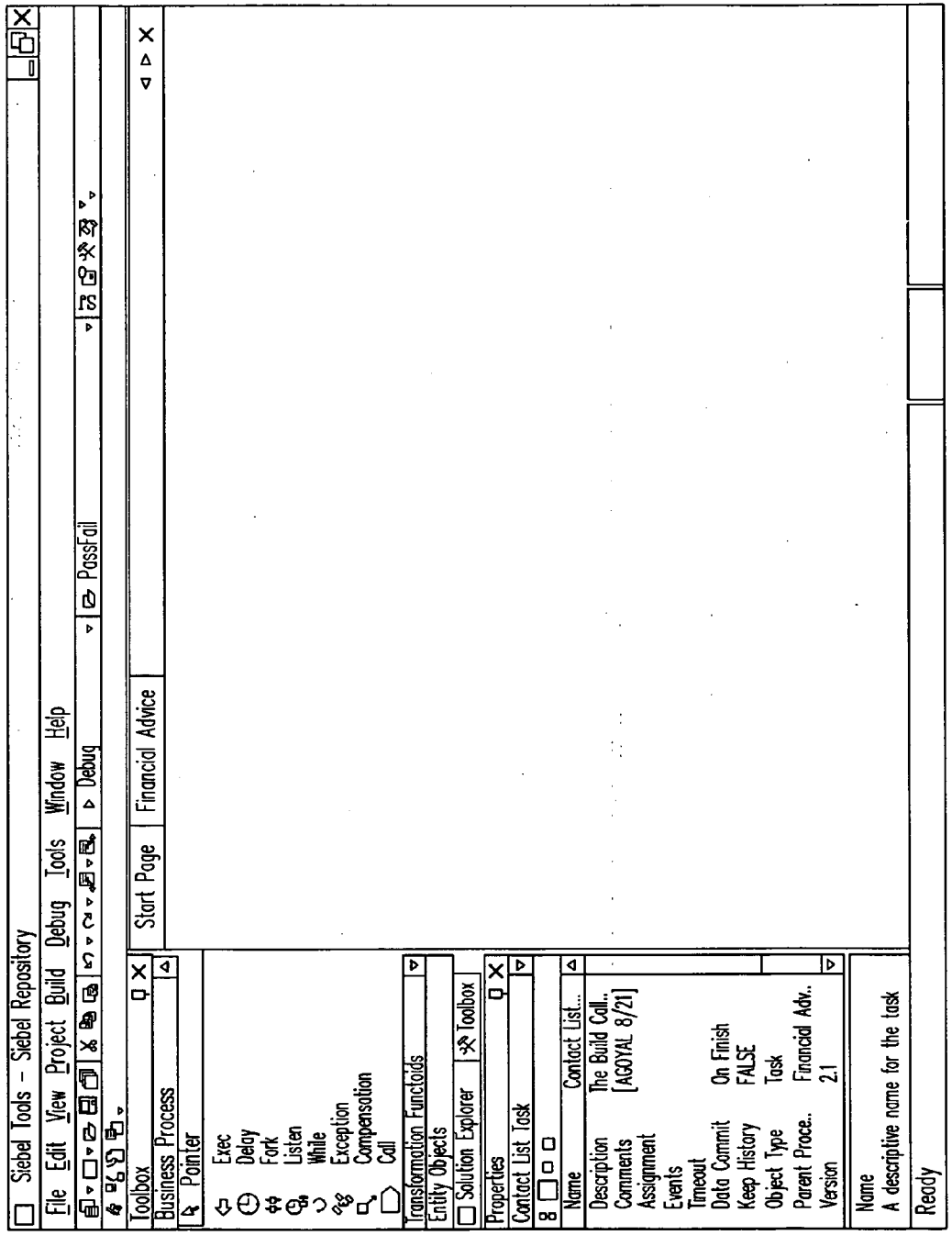
FIGS. 10A–10D illustrate embodiments of a user interface for an implementation engineer.

At block 520, a systems view of the process is displayed. FIG. 10A illustrates one embodiment of the systems view of the process, as shown to the developer. As can be seen, the swim lane labels change, to correspond to the Systems that handle each of the processes. For one embodiment, the process modeler automatically derives the technical interface display, where each swim lane identifies a system, through a transformation of the non-technical interface display, where each swim lane identifies an actor. This derivation process, for one embodiment, uses the functional blocks in the non-technical interface, which are flagged (by color, shape, etc.) identifying the system with which they are associated.

For one embodiment, the designer may set his or her preference on whether to display the portions of the flow that go through the integration server. For one embodiment, the system automatically generates the integration steps from the basic data provided by the business analyst. The system can automatically infer where an integration server is needed between two steps. For one embodiment, the system may further display synchronization steps. Synchronization steps indicate where the integration server synchronizes the data in various systems, to keep a consistent status.

For one embodiment, the "customer" swim lane may be differentiated to indicate that it is a different type of "system," e.g. not one under the control of the designer. In this Figure, the "systems" are logical system types, rather than actual systems. In the alternative the actual system (e.g. server, Siebel system, SAP, etc.) may be indicated. Also note that the separate swim lanes do not necessarily indicate a particular instance of a system. For example, the CRM (Customer Relationship Management) system may be two separate systems, a Call Center and a Service Organization. The developer may, at his or her option, separate the CRM swim lane into multiple lanes. This type of logical separation into systems illustrates to the developer the system interface elements that will be required to implement the process defined by the business analyst.

The systems view of the process shows, in each swim lane, a different system. The systems may include: a Siebel system, a third party system, and external systems such as the Internet. The systems view provides for each step and connection an identification of which system performs the step/connection.

Returning to FIG. 5, at block 525, the sequence determines whether any items need to be added. As noted above, the transfer/flagging sequence may have added one or more flags indicating that logical processes/steps are missing. Additionally, the developer may determine in reviewing the process that additional elements are needed. If so, at block 530, the developer is prompted to add additional elements. The additional elements may be error correction, checking, authentication, or any other required elements.

Figure 10B:
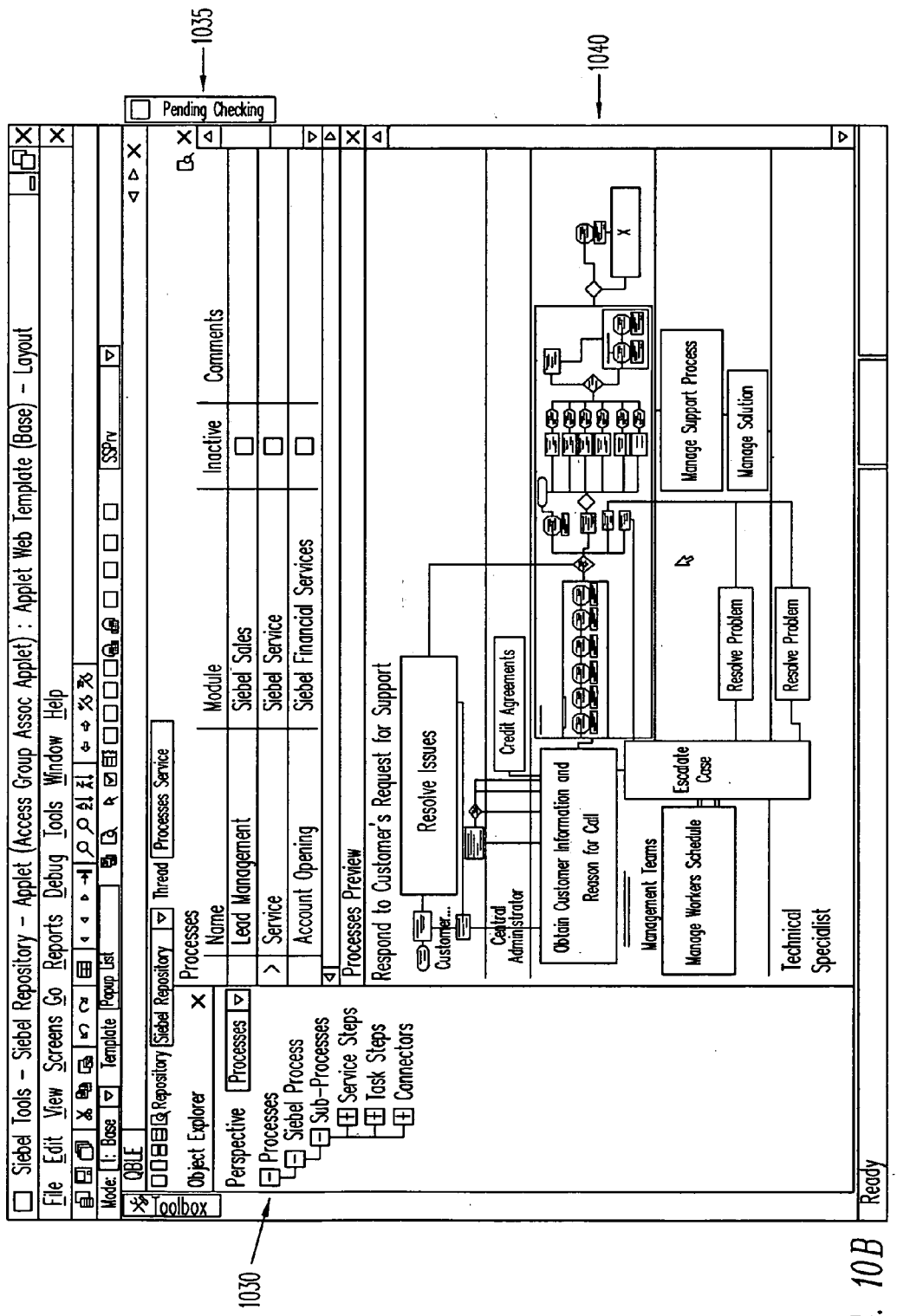

FIG. 10B illustrates one embodiment of a potential interface for a developer browsing through a library of available processes. The process tree 1030 illustrates the various processes available, and the subprocesses and tasks/steps available within each process. The preview window 1040 permits the developer to see the process, and drill down to see additional details if necessary. The developer may use the entire process or subprocess, or may simply mine the process or subprocess for ideas, or for particular details. The process list 1035 provides a list of processes that are available at the current branch of the tree 1030, including the current location(s) of the process, and any comments.

At block 535, the sequence permits the developer to add details and implement elements and connectors defined by the business analyst. The skill of implementing an element to perform an identified function or step is one known by developers. The present system assures that the function/step definition transfer between the business analyst and the developer is perfect.

Figure 10C:
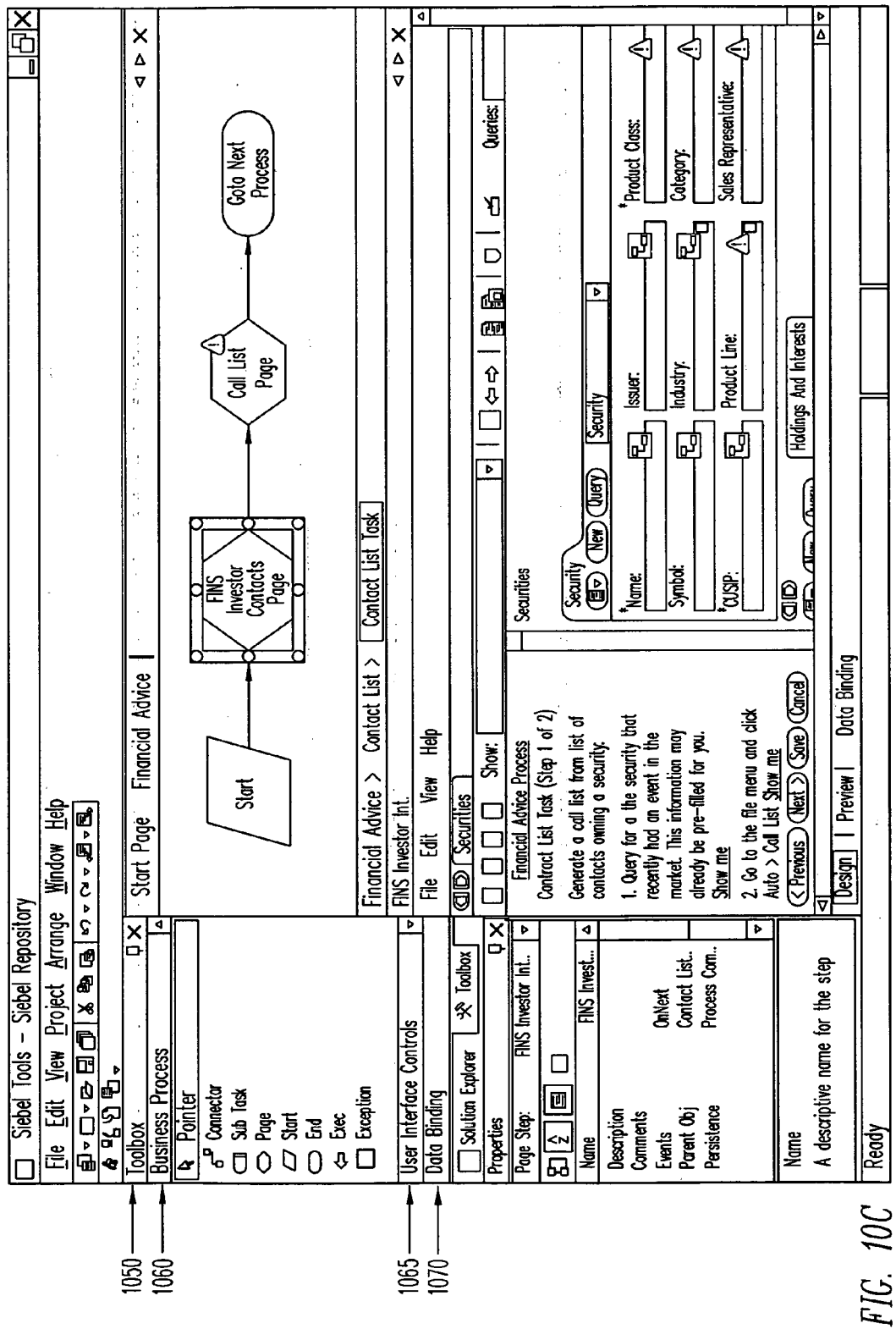
Figure 10D:
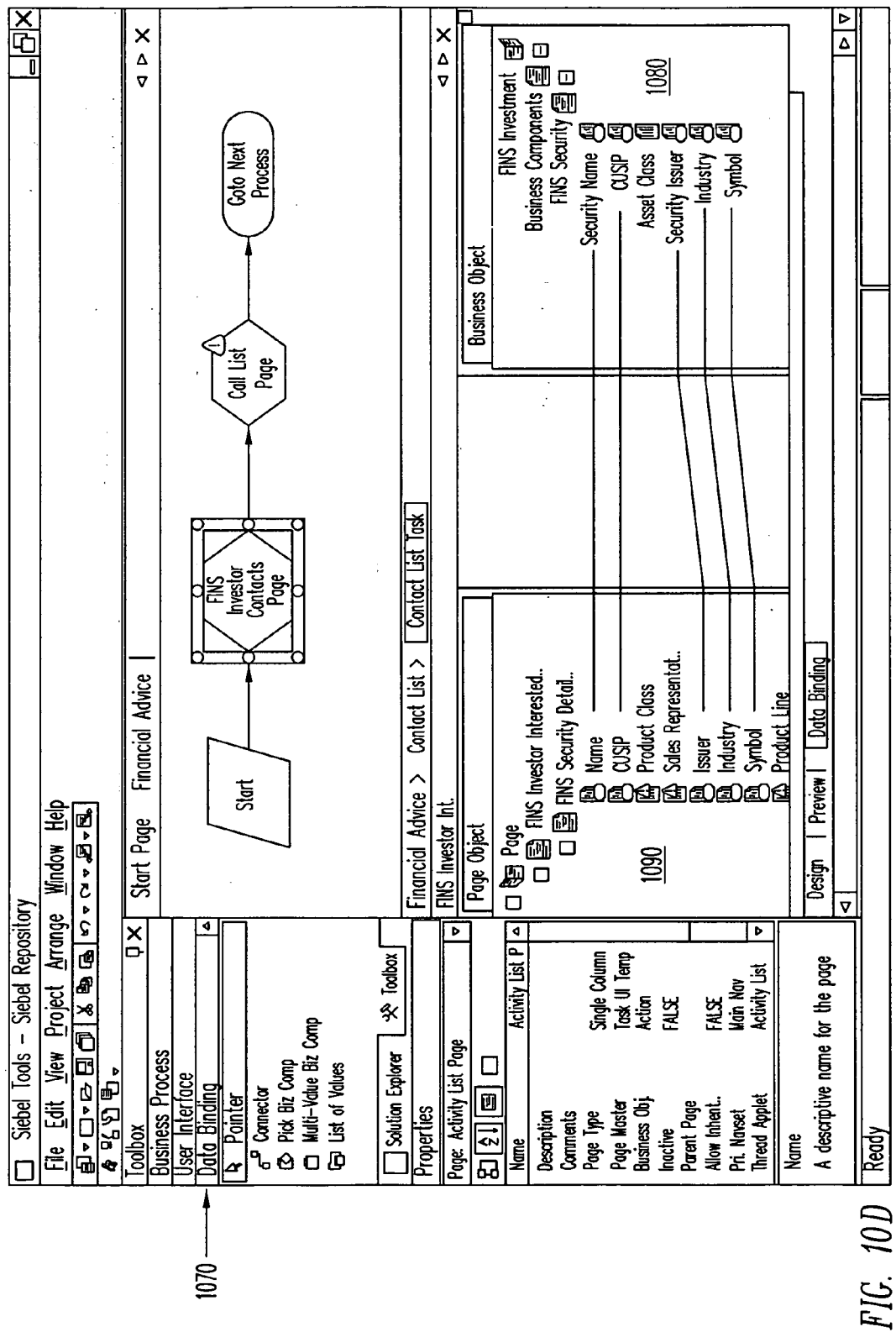

FIG. 10C illustrates one embodiment of the user interface configuration window for the developer. As can be seen, the toolbox 1050 includes, in addition to the business process 1060, and user interface controls 1065, data binding 1070. FIG. 10D illustrates one embodiment of the data binding. The data mapping interface 1080 allows drag and drop data binding of business objects to page objects (controls). As can be seen, the various page objects may have flags 1090, indicating as above, that further work is needed in defining the particular page object.

At block 540, the sequence determines whether external services are used. External services are those provided by other software applications or by services accessible over a network, such as the Internet. If there are no external services being used by the process, the sequence terminates at block 555. Otherwise, the sequence continues to block 545.

At block 545, the integration sequence is enabled. The integration sequence permits a connection between the software application running the process and external services.

Figure 11A:
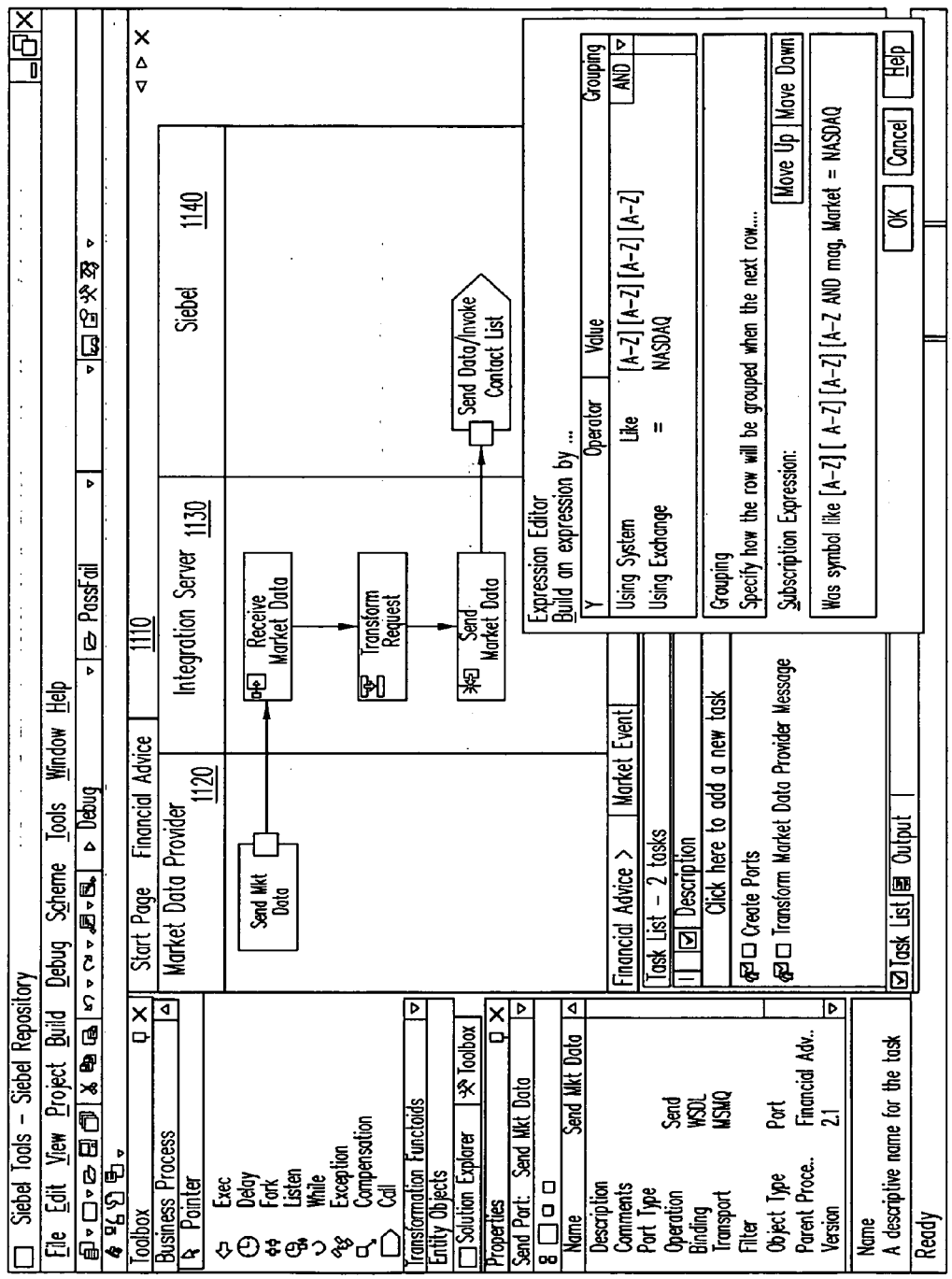
FIGS. 11A and 11B illustrate embodiments of an integration view.

FIG. 11A illustrates one embodiment of the integration sequence. The integration sequence receives messages from an external system, transforms them into common objects, and then transforms them into another system representation and sends them out. Of course, the integration sequence may include conditions, forking, looping, and similar software constructs. As can be seen, the swim lines 1110 illustrate the three active systems in this instance. They include an external service provider 1120, the integration server 1130, and the process provider 1140. In this example, the external market data feed sends market events to the integration server periodically. The integration server 1130 filters the data, for one embodiment using an expression filter, and transforms the data into the proper form to be received by the process provider 1140.

At block 550, the developer is prompted to define source, formats, and transforms to integrate the external source with the present process. The source defines the location and access mode for the external process. The format identifies the formats for addressing the external source, and the format in which data is received from the external source. And finally, the transform creates a transformation from the native format of the process to the format of the external source, and vice versa. Once each of these elements is defined, the developer then enables the communication with the external source, per the elements defined by the business analyst. The sequence then ends at block 555.

Figure 11B:
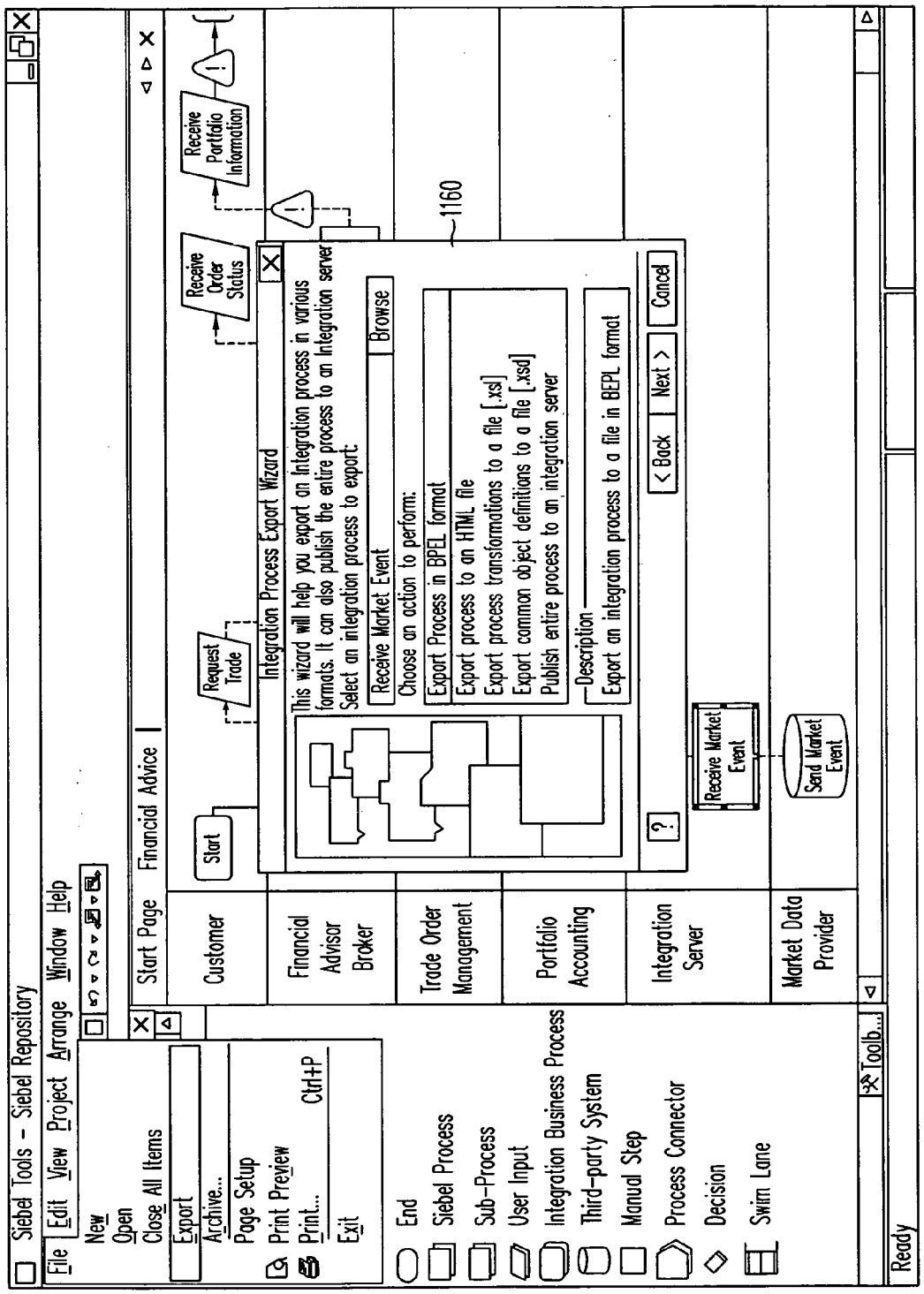

FIG. 11B illustrates one embodiment of the export option. The integration sequence export wizard exports process definitions and related meta-data in standard formats for consumption by third parties. The dialog box 1160 identifies the integration sequence being exported, and permits the specification of the format for export. This is useful because it makes the integration sequence available to external programs and parties.

The above-described sequence implements the process defined by the business analyst. For one embodiment, a quality assurance (Q&A) procedure may validate the process as implemented by the developer. Furthermore, the business analyst may be given one or more opportunities to review the implemented process and verify it. Once the process is completely verified, it is made available to the employees who will use it. Furthermore, for one embodiment, the process is put into the library of processes that are available for use in building future processes.

FIG. 6 illustrates one embodiment comparison between business analyst and developer features. The purpose of the modeler is different. For the business analyst, the purpose of the modeler is to create and edit customized business processes. For the developer, the purpose of the modeler is to implement/enable the business processes created by the business analyst. The fact that the modeler is an integrated modeler means that the communication of the process and the elements is perfect between the business analyst and developer. Furthermore, the developer need not recreate the work of the business analyst. In prior systems, the business analyst often created the process in a visual program, which could not be used for implementation. This created a communication gap as well as duplication of labor between the business analyst and the developer.

The view of the enterprise process also differs between the business analyst and the developer. The business analyst sees a role-based view, in which each actor has a swim lane, and each element or subprocess is associated with an actor or actors. This permits the business analyst to clearly visualize who performs each action. The developer, on the other hand, sees the process from a system-based view. The system based view shows each system in a separate swim lane, and illustrates to the developer each connection between the systems that will have to be implemented.

There is additionally toolset differentiation between the developer and the business analyst. The business analyst's toolset is a simplified, easy to use toolset, with more abstraction and reduced complexity. The developer's toolset is a full toolset allowing modification of elements, and integration with external systems. Those systems may be external systems, or systems integrated with the software application providing the business process.

With respect to integration, the business analyst need not concern himself or herself with integration of external services. Rather, the business analyst may assume that all services are available, and can be accessed by the process. The developer, on the other hand, receives a full set of integration tools, to enable the integration of the process with external systems including the Internet.

As can be seen the integrated process modeler provides different interfaces for the business analyst and the developer. However, the use of a single process modeler provides significant advantages to both the business analyst and the developer, building a more efficient team to create and implement business processes.

Figure 12:
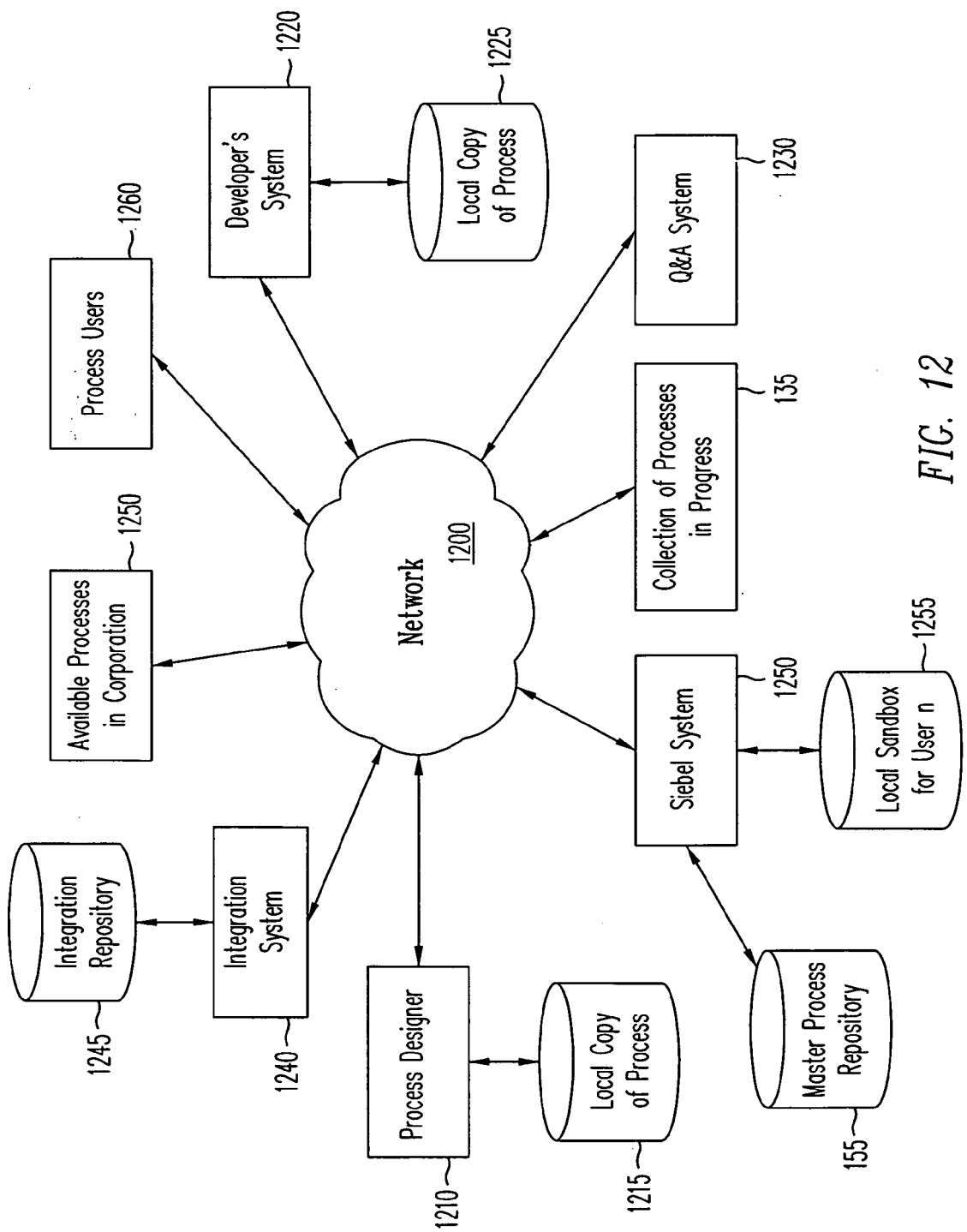
FIG. 12 is a block diagram of one embodiment of a network that may be used with the present invention.

FIG. 12 is a block diagram of one embodiment of a network that may be used with the present invention. The network 1200 may be an intranet within a company, the Internet, cable connections, busses within a computer system, a shared application bus, or any other means of coupling software applications that may reside on the same or on separate computer systems.

The business analyst's system, process designer 1210 is used to design new processes. There may be multiple process designers 1210 coupled to the system, although only one is shown here for simplicity. For one embodiment, the process designer 1210 may use a local copy of the process 1215 for editing. Alternatively, the process designer 1210 may access a sandbox 1255, over the network 1200, which provides a secure location to edit a process.

The best practice processes are available in a master process repository 155. The processes in the master process repository 155 are, for one embodiment, processes that were pre-created. For one embodiment, the best practice processes may further include processes created by business analysts that have been implemented. When the business analyst checks in a process, it is stored in the collection of processes in progress 135. These processes are waiting for implementation by the developer, on the developer's system 1220. The developer retrieves one or more processes from the collection 135, and implements them. The developer 1220 may have a local copy of the processes 1225 being edited, or may also use a separate sandbox 1255, connected to the Siebel system 1250.

For one embodiment, quality assurance system 1230 permits the testing of the implemented process. Once the developer, Q&A, and the business analyst all approve of a process, it can be made available by being placed into the available processes collection 1250. These available processes 1250 are used by process users 1260 throughout the company to automate certain processes, and to create uniformity of response throughout the corporation.

Note that although the above elements are described as "systems" they may be implemented on a single computer system. Alternatively, a single system may be distributed over multiple computers.

Figure 13:
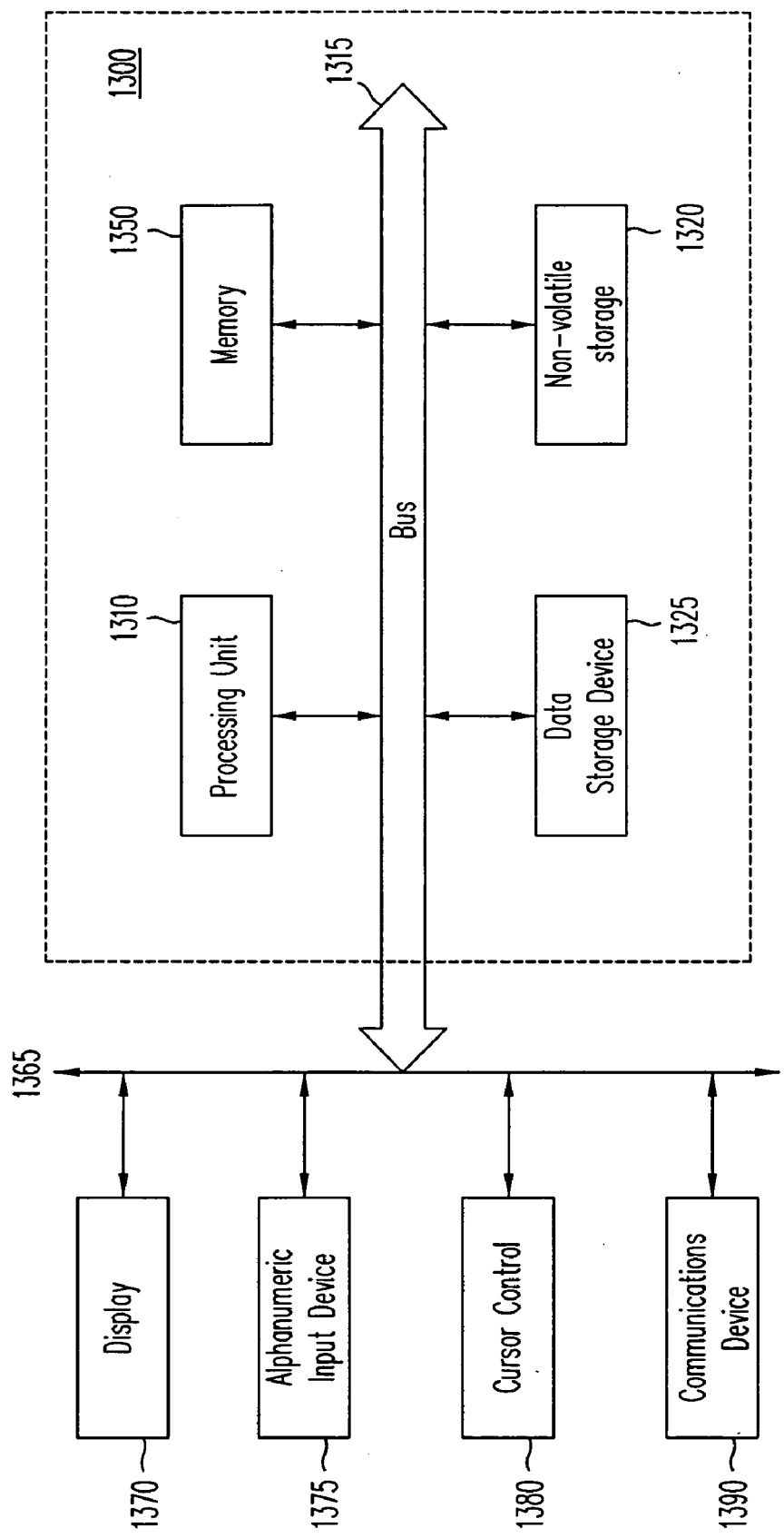
FIG. 13 is a block diagram of one embodiment of a computer system that may be used with the present invention.

FIG. 13 is one embodiment of a computer system that may be used with the present invention. It will be apparent to those of ordinary skill in the art, however that other alternative systems of various system architectures may also be used.

The data processing system illustrated in FIG. 13 includes a bus or other internal communication means 1315 for communicating information, and a processor 1310 coupled to the bus 1315 for processing information. The system further comprises a random access memory (RAM) or other volatile storage device 1350 (referred to as memory), coupled to bus 1315 for storing information and instructions to be executed by processor 1310. Main memory 1350 also may be used for storing temporary variables or other intermediate information during execution of instructions by processor 1310. The system also comprises a read only memory (ROM) and/or static storage device 1320 coupled to bus 1315 for storing static information and instructions for processor 1310, and a data storage device 1325 such as a magnetic disk or optical disk and its corresponding disk drive. Data storage device 1325 is coupled to bus 1315 for storing information and instructions.

The system may further be coupled to a display device 1370, such as a cathode ray tube (CRT) or a liquid crystal display (LCD) coupled to bus 1315 through bus 1365 for displaying information to a computer user. An alphanumeric input device 1375, including alphanumeric and other keys, may also be coupled to bus 1315 through bus 1365 for communicating information and command selections to processor 1310. An additional user input device is cursor control device 1380, such as a mouse, a trackball, stylus, or cursor direction keys coupled to bus 1315 through bus 1365 for communicating direction information and command selections to processor 1310, and for controlling cursor movement on display device 1370.

Another device, which may optionally be coupled to computer system 1300, is a communication device 1390 for accessing other nodes of a distributed system via a network. The communication device 1390 may include any of a number of commercially available networking peripheral devices such as those used for coupling to an Ethernet, token ring, Internet, or local or wide area network. The communication device 1390 may further be a null-modem connection, a wireless connection mechanism, or any other mechanism that provides connectivity between the computer system 1300 and the outside world. Note that any or all of the components of this system illustrated in FIG. 13 and associated hardware may be used in various embodiments of the present invention.

It will be appreciated by those of ordinary skill in the art that any configuration of the system may be used for various purposes according to the particular implementation. The control logic or software implementing the present invention can be stored in main memory 1350, mass storage device 1325, or other storage medium locally or remotely accessible to processor 1310.

It will be apparent to those of ordinary skill in the art that the system, method, and process described herein can be implemented as software stored in main memory 1350 or read only memory 1320 and executed by processor 1310. This control logic or software may also be resident on an article of manufacture comprising a computer readable medium having computer readable program code embodied therein and being readable by the mass storage device 1325 and for causing the processor 1310 to operate in accordance with the methods and teachings herein.

The present invention may also be embodied in a handheld or portable device containing a subset of the computer hardware components described above. For example, the handheld device may be configured to contain only the bus 1315, the processor 1310, and memory 1350 and/or 1325. The present invention may also be embodied in a special purpose appliance including a subset of the computer hardware components described above. For example, the appliance may include a processor 1310, a data storage device 1325, a bus 1315, and memory 1350, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 1310. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An end-to-end process modeler comprising:
   a non-technical interface to permit design of a business process by a non-technical user;
   a technical interface to implement substeps of the process to automate technical aspects of the process by a technical user, using the same process modeler; and
   a transfer and flagging logic to cause the process designed by the non-technical user to be accessible to the technical user for implementation, and to create visual indications of which elements need work for the technical user;
   wherein the implemented process is to automatically lead non-technical employees through the business process.

2. The end-to-end process modeler of claim 1, wherein the non-technical interface comprises:
   functional blocks to represent various types of steps and connectors that are used to create the process.

3. The end-to-end process modeler of claim 2, wherein the non-technical interface displays the functional blocks in swim-lanes, each swim-lane identifying an actor.

4. The end-to-end process modeler of claim 3, wherein each functional block is associated with a swim lane, in accordance with the actor who is to perform the functional block.

5. The end-to-end process modeler of claim 2, wherein the functional blocks are reusable.

6. The end-to-end process modeler of claim 2, wherein a type of the functional block is visually identifiable.

7. The end-to-end process modeler of claim 6, wherein the type of the functional block is differentiated one or more of: graphical icon, color, and shape.

8. The end-to-end process modeler of claim 1, wherein tools available in the non-technical interface are a simplified toolset to avoid confusing the non-technical user.

9. The end-to-end process modeler of claim 1, further comprising:
   a user identification logic to identify a user type, the user type corresponding to a technical or a non-technical user.

10. The end-to-end process modeler of claim 1, wherein the visual indications are flags, and elements and connections are flagged.

11. The end-to-end process modeler of claim 10, wherein the flags are associated with a plurality of types of flags, each type of flag indicating a type of work needed.

12. The end-to-end process modeler of claim 11, wherein the plurality of types of flags are differentiated by one or more of the following: graphical icon, shape, color, and size.

13. The end-to-end process modeler of claim 1, wherein the technical interface displays the functional blocks of the business process in swim-lanes, each swim-lane identifying a system.

14. The end-to-end process modeler of claim 13, wherein each functional block is associated with a swim lane, in accordance with the system on which the function implemented by the functional block is performed.

15. The end-to-end process modeler of claim 14, wherein the view is automatically converted from a role-based view to a system-based view, when the process is displayed in the technical interface.

16. The end-to-end process modeler of claim 15, wherein the conversion is based on the functional blocks, which identify the system by which the functional block is executed.

17. An apparatus to create an integrated business process comprising:
- a plurality of interfaces, each type of user interface associated with a user type;
- a user identification logic to identify the user type and display a corresponding one of the plurality of user interfaces, the plurality of user interfaces comprising a first user interface tailored for designing the business process, and a second user interface tailored for making the business process executable; and
- a transfer and flagging logic to flag elements and connectors requiring work after the business process is initially designed via the first user interface.

18. The apparatus of claim 17, wherein the plurality of user interfaces comprises a design interface, an implementation interface, and a high level overview interface.

19. The apparatus of claim 18, wherein the design interface is designed for a non-technical user, to create and edit the integrated business processes.

20. The apparatus of claim 19, wherein the design interface includes a plurality of elements and connectors to perform a task.

21. The apparatus of claim 20, wherein the design interface displays the plurality of elements in swim lanes organized according to an actor performing each of the elements.

22. The apparatus of claim 20, wherein the elements and the connectors available to the non-technical user are simplified.

23. The apparatus of claim 20, wherein the elements and the connectors available to the non-technical user are coded to identify a type of element or connector.

24. The apparatus of claim 23, wherein the coding of the elements and connectors comprise one or more of the following: graphical icon, color, shape, and size.

25. The apparatus of claim 18, wherein the implementation interface includes a plurality of programming oriented elements and connectors.

26. The apparatus of claim 25, wherein the implementation interface displays the plurality of elements in swim lanes organized according to a system on which the element is executed.

27. The apparatus of claim 26, wherein the view is automatically converted from a role-based view to a system-based view, when the process is displayed in the implementation interface.

28. The end-to-end process modeler of claim 27, wherein the automatic conversion uses the elements, each of which identifies the system performing the steps of the element.

29. A machine readable medium having stored thereon data representing sequences of instructions, which when executed by a computer system, cause said computer system to perform a method comprising:
- identifying a user type;
- displaying one of a plurality of user interfaces that is tailored for the user type, the plurality of user interfaces comprising a design interface targeted to a non-technical user, and an implementation interface targeted to a technical user, wherein the plurality of user interfaces permits a design and implementation of a business process; and
- flagging elements and connectors that require additional work for the implementation of the business process.

30. The machine readable medium of claim 29, wherein the method further comprising comprises:
- transferring the business process from the non-technical user to the technical user for implementation.

31. The machine readable medium of claim 30, wherein transferring the business process further comprises:
- generating a system-based view of the process from a role-based view shown to the non-technical user.

32. The machine readable medium of claim 31, wherein generating the system-based view of the process uses elements, each of which is associated with a system.

33. The machine readable medium of claim 29, wherein the business process comprises a plurality of elements and connectors.

34. A computer-implemented method comprising:
- identifying a user type;
- displaying one of a plurality of user interfaces that is tailored for the user type, the plurality of user interfaces comprising a design interface targeted to a non-technical user and an implementation interface targeted to a technical user, wherein the plurality of user interfaces facilitates a design and implementation of a business process; and
- flagging elements and connectors that require additional work for the implementation of the business process.

35. The method of claim 34, further comprising:
- transferring the business process from the non-technical user to the technical user for implementation.

36. The method of claim 34, wherein transferring the business process further comprises:
- generating a system-based view of the process from a role-based view shown to the non-technical user.

37. The method of claim 36, wherein generating the system-based view of the process uses elements, each of which is associated with a system.

38. The method of claim 34, wherein the business process comprises a plurality of elements and connectors.

* * * * *